United States Patent [19]

Evans et al.

[11] Patent Number: 5,258,463
[45] Date of Patent: Nov. 2, 1993

[54] BLENDS FOR CONSUMER WASTE BAGS

[75] Inventors: Susan P. Evans, Canandaigua, N.Y.; Pradeep P. Shirodkar, Somerset, N.J.

[73] Assignee: Mobil Oil Corporation, Fairfax, Va.

[21] Appl. No.: 933,849

[22] Filed: Aug. 24, 1992

[51] Int. Cl.⁵ .................. C08L 23/20; C08L 25/06; C08L 23/08; C08K 3/00
[52] U.S. Cl. .................. 524/528; 525/240; 525/199
[58] Field of Search .......... 525/240; 524/528

[56] References Cited

U.S. PATENT DOCUMENTS

| | | | |
|---|---|---|---|
| 3,364,284 | 1/1968 | Edmonds et al. | 525/240 |
| 3,660,530 | 5/1972 | Hoblit et al. | 260/876 |
| 3,703,565 | 11/1972 | Hoblit et al. | 260/876 |
| 4,359,544 | 11/1982 | Hwo et al. | 524/232 |
| 4,579,912 | 4/1986 | Canterino et al. | 525/240 |
| 4,716,201 | 12/1987 | Canterino et al. | 525/240 |
| 4,886,849 | 12/1989 | Hwo et al. | 524/263 |
| 4,921,911 | 5/1990 | Shirodkar | 525/240 |
| 4,929,681 | 5/1990 | Bahl et al. | 525/240 |
| 4,957,972 | 9/1990 | Shirodkar | 525/240 |
| 5,041,501 | 8/1991 | Shirodkar | 525/240 |
| 5,073,420 | 12/1991 | Yano et al. | 428/35.7 |

Primary Examiner—Carman J. Seccuro, Jr.
Attorney, Agent, or Firm—Alexander J. McKillop; Malcolm D. Keen; Marina V. Schneller

[57] ABSTRACT

The invention relates to novel blend compositions comprising a linear low density copolymer of ethylene and a minor amount of an olefin containing 4 to 10 carbon atoms (LLDPE), and to films of improved properties formed from such compositions. The invention includes a process of forming blown films from such compositions which is accomplished with improved processability and at least substantial retention of the desirable properties of the linear low density polyethylene. The invention also includes a waste bag formed from such blown film products.

6 Claims, No Drawings

BLENDS FOR CONSUMER WASTE BAGS

FIELD OF THE INVENTION

This invention relates to novel blend compositions comprising a linear low density copolymer of ethylene and a minor amount of an olefin containing 4 to 10 carbon atoms (LLDPE), and to films of improved properties formed from such compositions. Also included in the invention is the process of forming blown films from such compositions which is accomplished with improved processability and at least substantial retention of the desirable properties of the linear low density polyethylene. Also included in the invention is a waste bag formed from such blown film products.

BACKGROUND OF THE INVENTION

Linear low density polyethylenes exhibit extremely desirable properties in blown film products. However, processing characteristics of the linear low density polyethylene (LLDPE) are not equal to the inherent properties of the resin itself. Accordingly, processing aids have been employed in conjunction with the linear low density polyethylene resins to improve those processing characteristics. For example, binary blends containing high amounts (10 to 15%) of polypropylene or polystyrene with the LLDPE exhibit improved processing characteristics, but the high levels (10 to 15%) of polypropylene or polystyrene reduce the properties of the base LLDPE so greatly that little or no property advantages are seen in using the LLDPE. In addition to the binary blends, a ternary blend of LLDPE, polypropylene and polystyrene has been tested. The total amount of non-LLDPE is lower, processing is better than the LLDPE by itself, and film properties are largely retained in clear films of the ternary blend. However, when commercial quantities (0.5 to 10%) of color and necessary antiblock agents are added to the ternary blend of LLDPE, polypropylene and polystyrene, the quality of the films plummets and severely limits the commercial use of the blend in waste bags.

SUMMARY OF THE INVENTION

In accordance with the invention, a ternary blend containing LLDPE, isotactic polybutene and polystyrene, is provided which exhibits excellent processability with substantial retention of inherent properties of the LLDPE.

In accordance with the invention, a ternary blend containing LLDPE, isotactic polybutene and polystyrene, and containing commercial quantities (0.5 to 10%) of color and necessary antiblock agents is provided which exhibits excellent processability with substantial retention of inherent strength properties of the LLDPE per se.

In accordance with the invention, a blown film of a ternary blend containing LLDPE, isotactic polybutene and polystyrene, and containing commercial quantities (0.5 to 10%) of color and necessary antiblock agents is provided which exhibits excellent processability with substantial retention of inherent strength properties of the LLDPE per se.

In accordance with the invention, a process for making blown film of a ternary blend containing LLDPE, isotactic polybutene and polystyrene, and containing commercial quantities (0.5 to 10%) of color and necessary antiblock agents is provided which exhibits improved process efficiency, in terms of extruder amps and die pressure with substantial retention of inherent strength properties of the LLDPE per se.

DETAILED DESCRIPTION OF THE INVENTION

In accordance with the invention, a ternary blend containing LLDPE, isotactic polybutene and polystyrene, is provided which exhibits excellent processability with substantial retention of inherent properties of the LLDPE. In accordance with the invention the ternary blend containing LLDPE, isotactic polybutene and polystyrene, and containing commercial quantities (0.5 to 10%) of color and necessary antiblock agents exhibits excellent processability with substantial retention of inherent properties of the LLDPE.

The blend contains 87 to 96%, preferably 90 to 96% and most preferably 92 to 96% of linear low density polyethylene (percentage based on linear low density plus polystyrene plus polybutene). Linear low density ethylene copolymers (LLDPE) of this invention are linear copolymers of ethylene and a minor amount, preferably about 2 to 10 wt. %, of an olefin, preferably a 1-olefin, containing 4 to 10 carbon atoms and having a density of about 0.9 to 0.94, a melting point of about 110° to 130° C., and a melt index of about 0.2 to 10. The preferred olefin comonomers are 1-butene, 1-hexene and 1-octene. The LLDPE may be prepared by any of various methods known in the art, e.g., by relatively low pressure methods as disclosed, for example, in U.S. Pat. No. 4,076,698, or by relatively high pressure methods, as disclosed, for example, in U.S. Pat. Nos. 4,405,774 and 4,530,983.

The blends of the invention contain 1 to 10% (weight percent), preferably 2 to 8% and most preferably 3 to 5% of polybutene (percentage based on linear low density plus polystyrene plus polybutene). The butene-1 polymers contemplated under this invention are at least partially isotactic, partially crystalline polymers comprising at least 80 wt. %, preferably at least 90 wt. % of polymerized butene-1. These polymers include homopolymers of butene-1 and copolymers of at least about 80 wt. % of butene-1 and up to about 20 wt. % of at least one polymerized comonomer, e.g., an olefin, preferably a 1-olefin, containing 2 to about 10 carbon atoms, and preferably have a number average molecular weight of at least about 25,000, a density of from about 0.890 to 0.920, and a melt index of from about 0.1 to 40, (ASTM condition E). Some of these polymers are described in the article on "Polymers of Higher Olefins" in Kirk Othmer, *Encyclopedia of Chemical Technology*, Third Edition, Wiley Interscience, 1981, pages 470–477. The polymers may be prepared using a Ziegler Natta type catalyst as described, for example, in U.S. Pat. No. 3,362,940 or the foregoing Kirk Othmer article. In general, the butene-1 polymers in unblended form are capable of being formed into shaped articles such as films.

The blends of the invention contain 1 to 1? %, preferably 1 to 5% and most preferably 1 to 3% (percentage based on LLDPE plus polystyrene plus polybutene) of polystyrene. Preferably, the polystyrene is a polystyrene homopolymer. However, poly(para-methylstyrene) resins may be employed as partial or complete substitute(s) for the polystyrene. Moreover, the aromatic polymer can also contain comonomers providing that the aromatic monomer is the predominant constituent. For instance, high impact polystyrene can be used.

As noted above the blends of the invention can contain commercial quantities of color and antiblocking agents. The blend quantities of color and antiblocking agents ranges from 0.5 to 10%, preferably 1 to 8% and most preferably 1 to 6% of linear low density polyethylene (percentage based on LLDPE plus polystyrene plus polybutene). The color and antiblock agents include the following materials:

Anti block agents include diatomaceous earth (e.g. Superfloss ™, talc, including surface treated and finely ground talc and small glass or ceramic spheres.

Color agents include pigments commonly used in blown film such as: Titanium dioxide, Iron oxides and carbon black.

In addition to the polymer components, the blend may also contain any of various additives conventionally added to polymer compositions for different purposes, e.g. lubricants such as microtalc, stabilizers, compatibilizers, pigments, fluoroelastomers, etc.

Extrudable compositions of LLDPE, polystyrene and polybutene for reduction of the die amperage contained combined amounts of color and necessary antiblock agents of 0–10%, preferably 1% or less, and most preferably 0.01 to 1 weight percent.

The ternary blends of LLDPE may be prepared using any of various methods known in the art. For example, pellets of the three polymers may be dry blended and the blend added directly to a blown film extruder, e.g., a Sterling extruder, to produce films having a thickness, for example, of about 0.5 to 5 mils. Blown film is relatively thin as compared to film or sheet used in molding operations and is generally used in flexible packaging. In this process a narrow molecular weight distribution polymer is melt extruded through an extruder. Tubular products, for example, bags, can be produced. The tube may also be slit to form flat film. The film may also be oriented.

The following examples further illustrate the invention.

EXAMPLES

Films of about 1.0 mils nominal gauge thickness were prepared from LLDPE, which is a linear low density copolymer of ethylene and about 6 wt. % of 1-hexene having a density of about 0.922, a DSC melting point of about 121–124 and a melt index of about 0.5.

The polymer blends were prepared by dry blending the pellets and in the blends was based on the combined weight of the polymers.

The films were made in a 2½ inch Sterling blown film extruder under the following fabrication conditions: BUR (blow up ratio) of 2.5:1, production rate of 125–150 lb/hr, die gap of 48 mils, and a 6 inch die.

The results are set forth in the following Table:

The Quick Quality Index (QQI) is a measure of bag performance and quality. It is composed of 4 tests which test the film or bag in for MD PPT Tear Length, Air Impact (psi), TD Tensile Ultimate (mpsi), Rupture cell area. Shell 0400 polybutene-1 (a butene-1 homopolymer) having a density of about 0.915, a melt index of about 20, and a number average molecular weight of about 40000.

Notes:
All LL's are LLDPE hexene containing copolymers.
PB used is Shell 0400 polybutene.
PP used is Novalene 1400, a propylene ethylene copolymer.
PS used is Mobil 1240 polystyrene.
All samples were processed with same die gap and output.
Where compositions total less than 100, remaining inputs were color, antiblock, slip or flouroelastomer process aid masterbatches.
LL1 is a 0.5 MI, 0.922 gm/cc base resin density LLDPE octene copolymer.
LL2 is a 1.0 MI, 0.917 gm/cc base resin density LLDPE hexene copolymer.
Sample D versus B demonstrates superior processing (lower extruder current and much lower current/rpm) and improved properties of terblend containing polybutene versus that with polypropylene. Both samples process similarly to control LL2 (sample C) and much easier than control LL1 (sample A) alone.
In comparison to sample B, sample E demonstrates property improvement yet retains excellent processing characteristics.

These improved properties were accompanied by a superiority of processability in producing the ternary blends containing films indicated by lower values of screw tip pressure and screw amperes.

Thus it is apparent that there has been provided, in accordance with the invention, a polymer blend that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A ternary blend containing linear low density polyethylene (LLDPE), isotactic polybutene and polystyrene consisting of styrene, para-methylstyrene or mix-

TABLE

| Sample | A | B | C | D | E |
|---|---|---|---|---|---|
| Resin Composition | LL1 | LL1/PP/PS | LL2 | LL1/PB/PS | LL1/PB/PS |
| Resin Percentages* | 100 | 86/5/2 | 100 | 86/5/2 | 91/3/2 |
| Color and Anti-BLock | No* | Yes | No* | Yes | Yes |
| Output | 147 | 150 | 150 | 132 | 126 |
| Extruder Current Amp. | 70 | 63 | 60 | 42 | 44 |
| Extruder rpm | 60 | 63 | 53 | 78 | 73 |
| Quick Quality Index | 196* | 169 | 157* | 183 | 185 |
| MD PPT Tear Length, cm | 3.5 | 3.3 | 3.3 | 3.1 | 3.3 |
| Air Impact, psi | 21.9 | 15.2 | 17.7 | 20.2 | 21.0 |
| TD Tensile Ultimate, mpsi | 4.4 | 3.1 | 2.3 | 3.4 | 4.1 |
| Rupture Cell, area | 37.6 | 33.2 | 18.9 | 26.5 | 26.0 |

*QQI corrected for color and AB.

tures thereof, wherein the linear low density polyethylene contains an olefin of 4 to 10 carbon atoms and wherein the polybutene is at least partially isotactic, partially crystalline butene-1 polymer comprising at least about 80 wt. % of polymerized butene-1 wherein the relative amounts of each ranges as follows:

87 to 96% of LLDPE
  1 to 10% polybutene
  1 to 10% polystyrene
  0.01 to 10% color and antiblock agents.

2. The blend of claim 1, wherein the olefin of 4 to 10 carbon atoms is selected from the group consisting of butene-1, hexene-1, and octene-1.

3. In a process for making blown film comprising LLDPE and containing 0.5 to 10% of color and antiblock agents which films exhibits strength sufficient for waste bag production and which process is characterized by a high extruder amp/rpm ration, the improvement comprising extruding a ternary blend containing said LLDPE (linear low density polyethylene) with isotactic polybutene and polystyrene consisting of styrene, para-methylstyrene or mixtures thereof, in amounts ranging from 87 to 96% of LLDPE, 1 to 10% polybutene and 1 to 10% polystyrene, wherein the polybutene is at least partially isotactic, partially crystalline butene-1 polymer comprising at least about 80 wt % of polymerized butene, thereby reducing said ratio and recovering a film of said terpolymer characterized by substantial retention of inherent strength properties of the LLDPE.

4. In a composition of linear low density polyethylene (LLDPE) blended with an additive composition comprising 0.01 to 10% color and antiblock agents, which exhibits elevated extruder amp consumption during extrusion, an improved blend comprising an amount of polybutene and polystyrene to reduce said extruder amp consumption during extrusion of the blend, whereby the blend comprises linear low density polyethylene (LLDPE), isotactic polybutene and polystyrene consisting of styrene, para-methylstyrene or mixtures thereof, wherein the linear low density polyethylene contains an olefin of 4 to 10 carbon atoms and wherein the polybutene is at least partially isotactic, partially crystalline butene-1 polymer comprising at least about 80 wt. % of polymerized butene-1 wherein the relative amounts of each ranges as follows:

87 to 96% of LLDPE
  1 to 10% polybutene
  1 to 10% polystyrene
  0.01 to 10% color and antiblock agents.

5. In a blend for blown film production comprising linear low density polyethylene (LLDPE) and an additive composition comprising 0.01 to 10% color and antiblock agents, which blend exhibits elevated extruder amp consumption during extrusion, an improved blend comprising an amount of polybutene and polystyrene consisting of styrene, para-methylstyrene or mixtures thereof, sufficient to reduce said extruder amp consumption during extrusion of the blend, whereby the improved blend comprises 0.01 to 10% of color and antiblock agents and 87 to 96% of LLDPE
  1 to 10% polybutene
  1 to 10% polystyrene wherein the linear low density polyethylene contains an olefin of 4 to 10 carbon atoms and wherein the polybutene is at least partially isotactic, partially crystalline butene-1 polymer comprising at least about 80 wt. % of polymerized butene-1.

6. In a blown film comprising (1) linear low density polyethylene (LLDPE) and (2) 0.01 to 10% of an additive composition selected from the group consisting of color agents, antiblock agents, and admixtures thereof, which exhibits a reduction in Air Impact (psi) and TD tensile Ultimate (mpsi), the improvement comprising a ternary blend which exhibits substantial retention of the inherent Air Impact (psi) and TD tensile Ultimate (mpsi) of (1) and comprises 87 to 96% of LLDPE
  1 to 10% polybutene
  1 to 10% polystyrene consisting of styrene, para-methylstyrene or mixtures thereof wherein the linear low density polyethylene contains an olefin of 4 to 10 carbon atoms and wherein the polybutene is at least partially isotactic, partially crystalline butene-1 polymer comprising at least about 80 wt. % of polymerized butene-1.

* * * * *

UNITED STATES PATENT AND TRADEMARK OFFICE
CERTIFICATE OF CORRECTION

PATENT NO. : 5,258,463

DATED : November 2, 1993

INVENTOR(S) : Susan P. Evans and Pradeep P. Shirodkar

It is certified that error appears in the above-identified patent and that said Letters Patent is hereby corrected as shown below:

Col. 5, line 18, Claim 3, "ration" should read --ratio--.

Col. 5, line 11, Claim 2, "Claim 1" should read --Claim 4 --.

Signed and Sealed this

Twenty-sixth Day of April, 1994

Attest:

BRUCE LEHMAN

*Attesting Officer*  *Commissioner of Patents and Trademarks*